(No Model.) 2 Sheets—Sheet 1.
G. KUEGLER.
COOKING UTENSIL.
No. 559,899. Patented May 12, 1896.
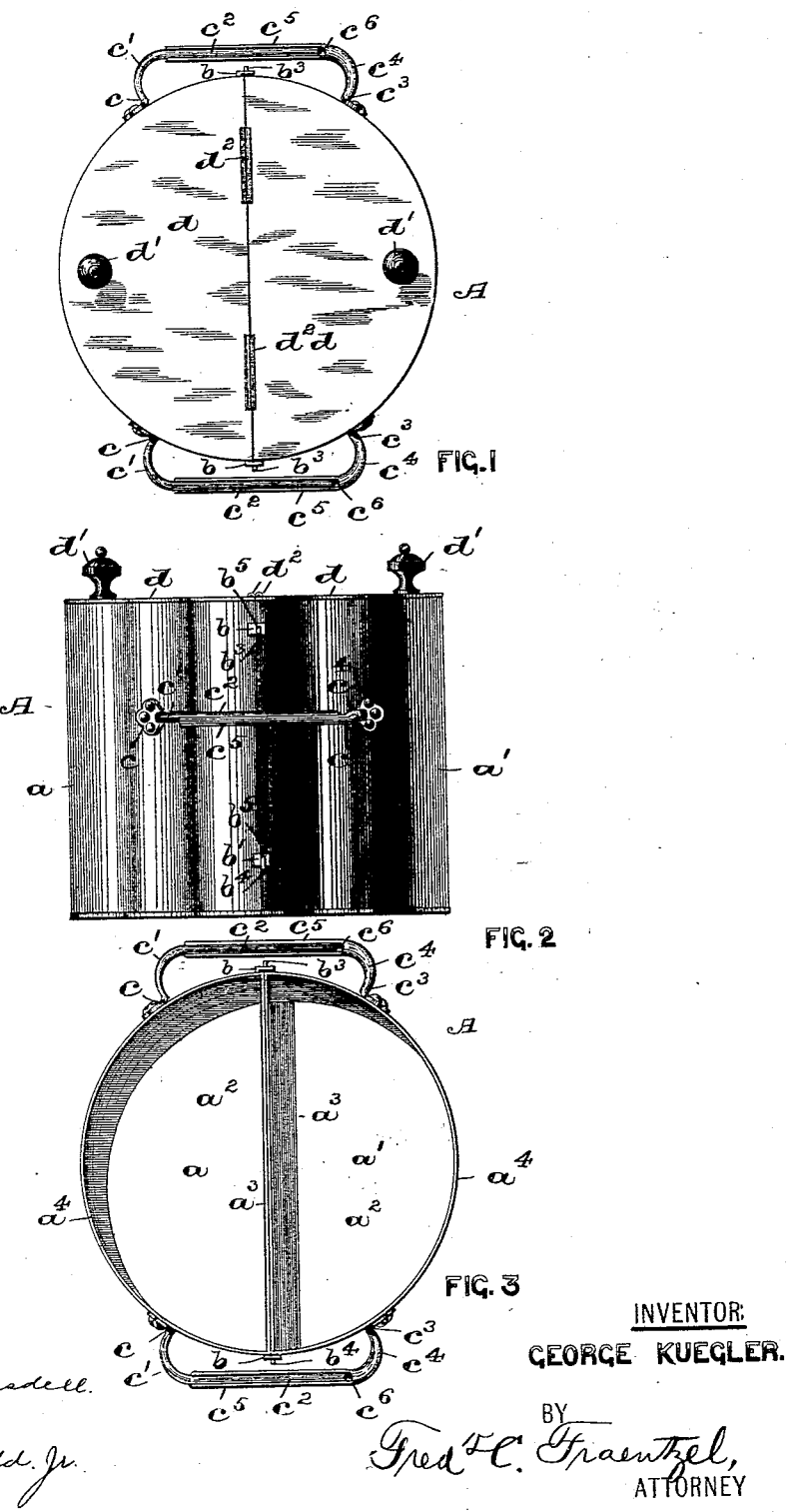
WITNESSES:
B. Mortimer Tinsdale.
Wm. H. Canfield, Jr.
INVENTOR:
GEORGE KUEGLER.
BY Fred C. Fraentzel,
ATTORNEY (No Model.) 2 Sheets—Sheet 2.

G. KUEGLER.
COOKING UTENSIL.

No. 559,899. Patented May 12, 1896.

WITNESSES:
B. Mortimer Trusdell.
Wm. H. Canfield, Jr.

INVENTOR:
GEORGE KUEGLER.
BY
Fred. C. Fraentzel,
ATTORNEY.

ANDREW B.GRAHAM, PHOTO-LITHO. WASHINGTON, D.C.

UNITED STATES PATENT OFFICE.

GEORGE KUEGLER, OF JERSEY CITY, NEW JERSEY.

COOKING UTENSIL.

SPECIFICATION forming part of Letters Patent No. 559,899, dated May 12, 1896.

Application filed February 18, 1896. Serial No. 579,741. (No model.)

*To all whom it may concern:*

Be it known that I, GEORGE KUEGLER, a subject of the Emperor of Germany, residing at Jersey City, in the county of Hudson and State of New Jersey, have invented certain new and useful Improvements in Cooking Utensils; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel construction of cooking utensil; and the object of the invention is to secure in one device in cooking all the advantages arising from the use of two or more utensils, and yet obviate certain objectional features which have materially interfered with such use in various kinds of cooking.

In my improvement I combine two or more cooking-receptacles in one apparatus which are detachably connected, whereby each receptacle can be used independent of the other, but are adapted to be used together, being connected in such a manner that they can be lifted from or placed on the stove together.

The invention therefore consists in the novel construction of cooking utensil to be hereinafter fully described, and also in the peculiar arrangements and combinations of parts, substantially as set forth in the specification and finally embodied in the clauses of the claim.

Figure 4:
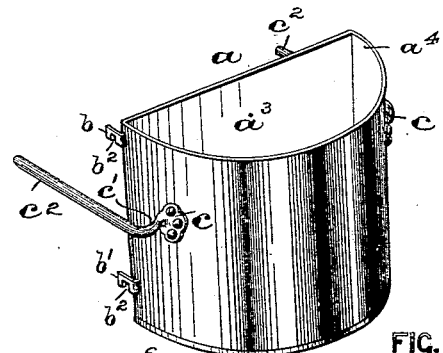
Figure 5:
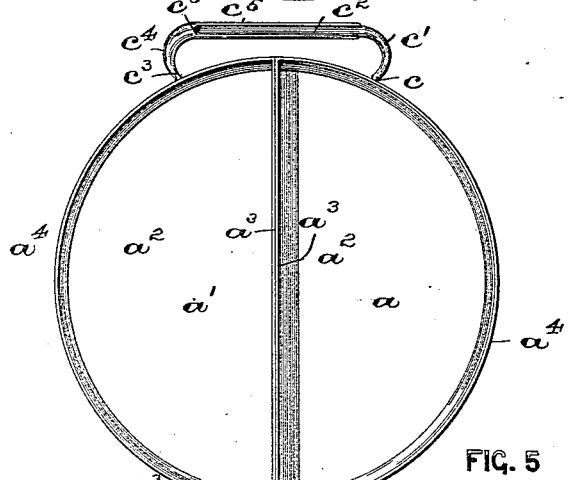
Figure 6:
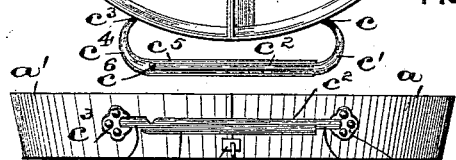
Figure 7:
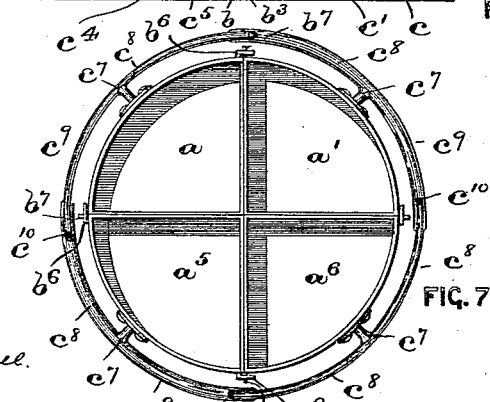

Referring to the accompanying drawings, in which like letters of reference indicate corresponding parts in each of the several figures of the drawings, Figure 1 is a top or plan view of my novel form of cooking utensil. Fig. 2 is a side view of the same, and Fig. 3 is a plan or top view of the utensil with the covers removed. Fig. 4 is a perspective view of one of the cooking-receptacles illustrated in said Figs. 1, 2, and 3. Figs. 5 and 6 are a plan and side view, respectively, of a frying-pan made according to the principles of my invention; and Fig. 7 is a plan view of still another modified form of construction of cooking utensil, but still embodying the novel features of my invention.

In said drawings, A indicates the cooking utensil, comprising two or more pots or pans $a$ and $a'$, as will be seen more especially from Figs. 2, 3, and 5. Each pot or pan $a$ or $a'$ is made semicircular, as clearly represented in the several figures of the drawings, consisting, essentially, of a bottom $a^2$, a straight side $a^3$, and the round or semicylindrical side $a^4$; but any other suitable shape or configuration may be used in place of the side $a^4$, as will be clearly evident. The pot or pan $a$ has a pair of holding ears or lugs $b$ $b'$ on opposite sides, and each lug is provided with a slot $b^2$, as will be clearly seen from Fig. 4, and each pot or pan $a'$ is provided with correspondingly-arranged holding ears or lugs $b^3$ and $b^4$, also on opposite sides of the pot or pan, which are likewise slotted to form the retaining-fingers $b^5$, as clearly represented in Figs. 2 and 6.

When the two pots or pans $a$ and $a'$ are placed side by side to form the complete cooking utensil A, then the slotted portions of the ears or lugs $b$ and $b'$ fit into the slotted portions of the ears or lugs $b^3$ and $b^4$, thereby forming a complete lock, which prevents any accidental separation of the two pots or pans $a$ and $a'$.

As will be seen, the pot or pan $a$ has secured thereon on opposite sides and in any well-known manner the handles $c$, which are curved, as at $c'$, and are provided with the long handle portions $c^2$, while the pot or pan $a'$ is provided with similar handles $c^3$, curved, as at $c^4$, and having the handle portions $c^5$, provided with the grooves $c^6$. When the pots or pans are placed side by side and locked in the manner hereinabove stated, then the said handle portions $c^2$ of the handles $c$ will rest in the grooves $c^6$ of the handle portions $c^5$ of the handles $c^3$, and by taking hold of the two handle portions $c^2$ and $c^5$ both pots or pans $a$ and $a'$ can together be placed upon or lifted from the stove; but when it is desired to separate the two pots or pans $a$ and $a'$ all that is necessary is to take hold of the handles $c$ at the bend $c'$ and the lugs or ears $b$ and $b'$ are disengaged from the lugs or ears $b^3$ and $b^4$, as will be clearly evident, and the pot or pan $a$ can be carried independent of the pot or pan $a'$.

Each pot or pan may be provided with a suitable cover or lid $d$, having a lift or knob $d'$, said covers being preferably hinged together, as at $d^2$; but these hinges on the covers may be dispensed with, if desired.

In Fig. 7 I have illustrated an arrangement of four pots $a$, $a'$, $a^5$, and $a^6$, all of which are detachably connected by the lugs or ears $b^6$ and $b^7$, similar in construction to those described in connection with the pots or pans illustrated in Figs. 1 to 6, inclusive. Each pot is provided with a portion $c^7$, from which extend in opposite directions the handle portions $c^8$ and $c^9$. The handle portions connected with the pots $a'$ and $a^5$ are provided with the grooves $c^{10}$, into which fit the ends of the handle portions connected with the pots $a$ and $a^6$. By taking hold of the handle portions connected with the pots $a'$ and $a^5$ all of the four pots can be carried together without separating them; but to disconnect them all that is necessary is to take hold of the handle portions attached to the pots $a$ and $a^6$, and then the lugs or ears $b^6$ and $b^7$ will immediately become disengaged and each pot can be carried independent of the other.

By my improvement I have devised a utensil in which different articles of food may be cooked at one time, which is of great advantage where the cook is cramped for space, since by this arrangement of two or more pots or pans and the means for connecting them to practically form one utensil the latter can be placed on one of the fire-holes in the stove, and hence occupies no more space than a pot constructed in the old and well-known manner, while at the same time it takes the place of two or more such pots in its use.

Having thus described my invention, what I claim is—

1. The herein-described cooking utensil, comprising therein, two or more pots or pans, and means connected therewith, for detachably securing said pots or pans together, substantially as and for the purposes set forth.

2. The herein-described cooking utensil, comprising therein, two or more pots or pans, and means connected therewith, for detachably securing said pots or pans together, consisting, essentially, of slotted hooks, as $b$, $b'$ and $b^4$, $b^5$, adapted to be brought into holding or locked engagement, substantially as and for the purposes set forth.

3. The herein-described cooking utensil, comprising therein, two or more pots or pans, means connected therewith, for detachably securing said pots or pans together, and handles $c$ and $c^3$, adapted to lie one upon the other, substantially as and for the purposes set forth.

4. The herein-described cooking utensil, comprising therein, two or more pots or pans, means connected therewith, for detachably securing said pots or pans together, consisting, essentially, of slotted hooks, as $b$, $b'$ and $b^4$, $b^5$, adapted to be brought into holding or locked engagement, and handles $c$ and $c^3$, adapted to lie one upon the other, substantially as and for the purposes set forth.

5. The herein-described cooking utensil, comprising therein, a pair of pots or pans $a$ and $a'$, having flat sides $a^3$, and semicylindrical sides $a^4$, and holding ears or lugs $b$ and $b'$ and $b^4$ and $b^5$ on said pots or pans, said lugs or ears being slotted and provided with fingers, whereby they can be brought into holding or locked engagement, substantially as and for the purposes set forth.

6. The herein-described cooking utensil, comprising therein, a pair of pots or pans $a$ and $a'$, having flat sides $a^3$, and semicylindrical sides $a^4$, and holding ears or lugs $b$ and $b'$ and $b^4$ and $b^5$ on said pots or pans, said lugs or ears being slotted and provided with fingers, whereby they can be brought into holding or locked engagement, a handle $c$ having a holding portion $c^2$ on said pot or pan $a$, and a handle $c^3$ having a grooved holding portion $c^5$, on said pot or pan $a'$, all arranged, substantially as and for the purposes set forth.

In testimony that I claim the invention set forth above I have hereunto set my hand this 7th day of February, 1896.

GEORGE KUEGLER.

Witnesses:
FREDK. C. FRAENTZEL,
WM. H. CAMFIELD, Jr.